May 28, 1929. F. R. DEAN 1,714,851

CORN STALK CUTTING AND ASSEMBLING MACHINE

Filed March 2, 1925 2 Sheets-Sheet 1

INVENTOR.
Fielden R. Dean
BY
ATTORNEY.

May 28, 1929.  F. R. DEAN  1,714,851
CORN STALK CUTTING AND ASSEMBLING MACHINE
Filed March 2, 1925  2 Sheets-Sheet 2

INVENTOR.
Fielden R. Dean
BY
Albert J. Fihe
ATTORNEY.

Patented May 28, 1929.

1,714,851

UNITED STATES PATENT OFFICE.

FIELDEN R. DEAN, OF HENRY COUNTY, KENTUCKY.

CORNSTALK CUTTING AND ASSEMBLING MACHINE.

Application filed March 2, 1925. Serial No. 12,484.

This invention relates to improvements in corn stalk cutting and assembling machines and has for one of its principal objects the provision of an automatically operated machine adapted to cut corn stalks or similar agricultural products standing in the fields and to deliver the cut stalks in bunches ready for shocking.

One of the important objects of this invention is the provision of a machine for cutting corn stalks or the like which is so designed that any stalks which have been blown to the ground will be picked up, cut, and delivered in bunches as effectively and at the same time as those stalks standing erect.

Another important object of this invention is the provision of corn stalk cutting and assembling machines or similar harvesting implements which shall be composed of a minimum of parts and therefore simple yet efficient in operation and not likely to get out of order.

Still another important object of the invention is the provision of traction means for a corn cutting machine or similar harvesting implement, the draft of which is arranged at the left hand side of the apparatus to prevent horses or a tractor employed in drawing the same from destroying standing crops.
Another and still further important object of the invention is the provision of a corn cutting machine or the like provided with an adjusting mechanism whereby the same may be raised or lowered for cutting corn or similar products at different heights from the ground, as desired.

Other and further important objects of the invention will be apparent from the disclosures in the accompanying drawings and following specification.

The invention, in a preferred form, is illustrated in the drawings and hereinafter more fully described.

In the drawings:
Figure 1 is a top plan view of the improved corn cutting machine of this invention.

Figure 1:
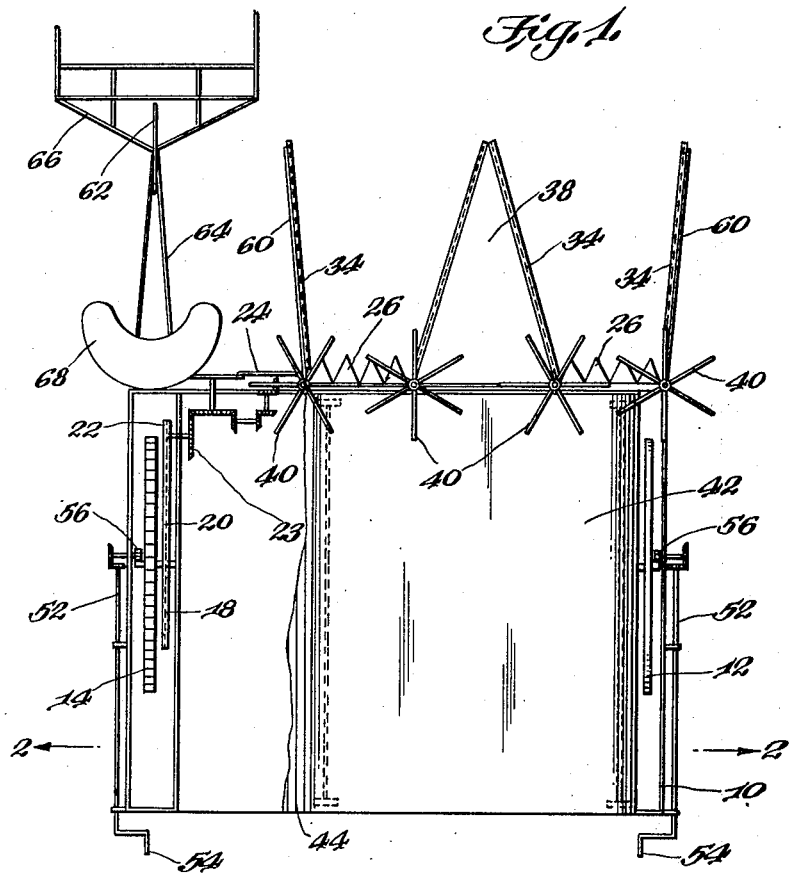

The reference numeral 10 indicates generally the bed or frame of the improved corn harvesting machine of this invention, being suitably mounted on wheels 12 and 14, one of said wheels as shown at 14 being of a wider tread and provided with cleats 16 or other ground gripping elements whereby it will be effective as a driving wheel for the mechanism of the improved harvesting device.

Figure 4:
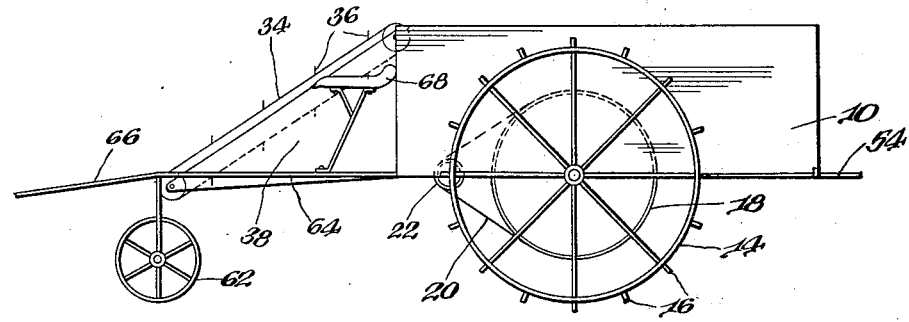
Figure 4 is a left side view of the corn cutting machine, illustrating a slight modification.

As best shown in Figure 4, the driving wheel is equipped with a driving sprocket 18 having a chain 20 fitted thereto, which in turn drives a smaller sprocket 22 which is directly connected by means of shafts, bevel gears and the like, as shown at 23, to the cutting and operating mechanism of the apparatus.

A pitman rod 24 is operated by these driving elements 22—23, which, in turn, reciprocates an ordinary set of mowing machine blades 26 suitably positioned in the forward portion of the device and adapted to cut two or more rows of corn as the apparatus is drawn over the field.

Figure 3:
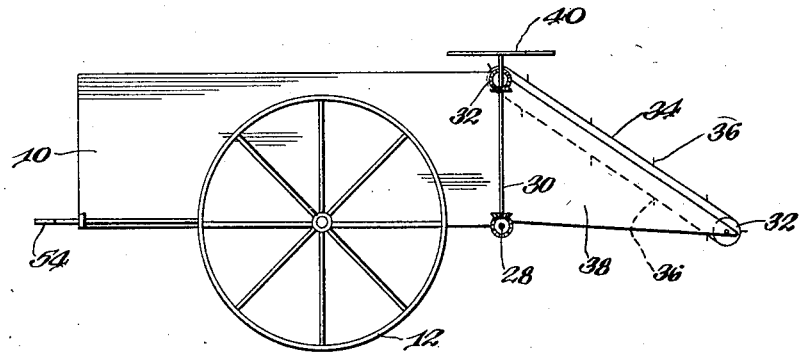
Figure 3 is a side elevation of the improved machine of this invention as viewed from the right.

Another suitable train of gears also driven by the sprocket 22 and the bevel gears 23 operates a horizontal transversely extending shaft 28 which extends across the front of the frame, as best shown in Figure 3, to transmit power to a series of conveyor chains and stalk gathering spiders. The right hand end of the revolving shaft 28 is equipped with a bevel gear which, in turn, drives through a similar gear, an upright shaft 30 adapted to operate through a corresponding set of gears and a shaft at the top thereof, a plurality of chain carrying sprockets 32 upon each of which is mounted a conveyor chain 34 provided with protruding fingers or the like 36.

As best shown in Figure 1, four or more of such conveyor chains 34 equipped with fingers 36 are provided, all suitably operated in unison and arranged at angles to each other as shown so that the protruding fingers 36 are adapted to pick up and engage the corn stalks, whether fallen or otherwise, and hold them in upright position for the cutting blades 26 to operate. A suitable triangular shield 38 is provided in the central portion of the device adapted to pass between the rows and having its sides arranged to serve as guides for the chains 34, whereby proper relation between the chains 34 and fingers 36 and the mowing blades 26 with respect to the stalks will be maintained at all times.

Figure 2:
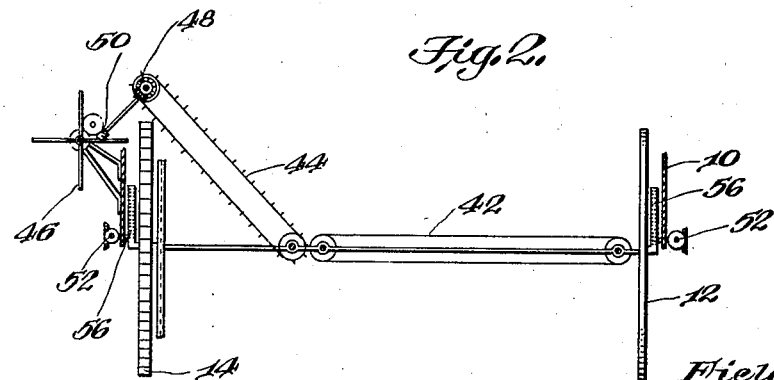
Figure 2 is a vertical transverse sectional view of the machine, taken on the line 2—2 of Figure 1.

As best shown in Figures 1, 3, and 4, a plurality of co-operating stalk gathering spiders 40 are mounted adjacent the upper delivery ends of the conveyor chains 34, which spiders revolve, being driven by suitable mechanism, and are adapted to engage the cut stalks at this point and throw them horizontally across a laterally moving conveying belt 42, as best illustrated in Figures 1 and 2, which conveys the cut stalks to a co-operating conveyor belt 44 inclined at an angle as illustrated in Figure 2, and which, in turn, delivers the cut corn stalks to a slowly revolving hopper 46 positioned at the right side of the machine and comprising a plurality of partitions, as illustrated, so as to deliver the cut corn in bunches at regular intervals ready to be loaded or placed in shocks. Suitable bevel gears 48 and a worm gear 50 are provided to operate the conveyor 44 and hopper 46, as best illustrated in Figure 2.

As indicated at 52 in Figure 1, a suitable frame adjusting device is provided on either side of the machine, including an operating handle 54 and a suitable gear and co-operating elevating rack 56, whereby the height of the frame 10 and its appurtenances from the ground may be adjusted as desired.

The outer ends of the conveying and stock assembling chains 34 are mounted on suitable sprockets at the ends of extending brace elements 60, but, as illustrated in the modification shown in Figure 4, a small wheel or the like may be mounted at the outer end of each of these brace elements 60 whereby they will be more adequately supported and will further be enabled to ride over obstructions or the like which might be encountered in the course of travel of the machine.

At the left hand side of the device is the draft apparatus comprising braces 64 and suitable connecting and draft equalizing means 66 whereby the machine may be connected for desired operation to a team of horses or to a tractor. The draft apparatus being mounted at the left hand side of the device eliminates any possible destruction or damage to standing crops.

A seat 68 is provided for the operator, as illustrated, and suitable clutch elements for engaging and disengaging the various operating mechanisms may be provided with operating levers conveniently positioned adjacent the driver's seat.

It will be seen that herein is provided a machine particularly adapted for cutting and gathering corn stalks or the like which will positively gather stalks which have fallen or blown to the ground, thereby overcoming one of the great objections to this type of machine which has hitherto existed. Moreover, the machine is adjustable and readily operated, whereby it can be accommodated for use with other similar crops if desired, and the fact that the cut and gathered stalks are automatically disposed in similar bunches at regular intervals constitutes an additional desirable and distinctive feature.

I am aware that many changes may be made and numerous details of construction varied throughout a wide range without departing from the principles of this invention, and I therefore do not purpose limiting the patent granted hereon otherwise than as necessitated by the prior art.

I claim as my invention:

1. A corn stalk cutting and delivering mechanism, comprising a frame, supporting wheels for the frame, stalk erecting and gathering means located anterior of said frame, said means comprising angularly depending supports, a plurality of conveyor chains mounted on suitable sprockets on the supports and having projecting fingers, reciprocable cutting blades for the erected stalks, and assembling means for the cut stalks comprising revolving intermeshing spiders adjacent the inner end of the aforesaid conveyor chains, said spiders adapted to deliver the cut stalks to a laterally movable conveyor and delivery belt.

2. A corn stalk cutting and delivering machine, comprising a frame, supporting wheels for the frame, stalk erecting and gathering means located anterior of said frame and comprising a plurality of conveyor chains mounted on suitable operatively driven sprockets and projecting fingers on said chains, cutting blades for the erected stalks, and assembling means for the cut stalks comprising revolving intermeshing spiders adjacent the inner end of the aforesaid conveyor chains, said spiders adapted to deliver the cut stalks to a laterally movable conveyor and delivery belt, together with an automatically operated hopper for assembling and delivering quantities of the cut stalks at regular intervals from the said conveying belt, all of said erecting, gathering, cutting, assembling, and delivering means being operated by the motion of the machine.

3. A corn stalk cutting and delivering machine, comprising a frame, supporting wheels for the frame, stalk erecting and gathering means located anterior of said frame and comprising a plurality of conveyor chains mounted on suitable sprockets and having projecting fingers, ground wheel supports for the outer ends of said gathering means, cutting blades for the erected stalks, and assembling means for the cut stalks comprising revolving intermeshing spiders adjacent the inner end of the aforesaid conveyor chains, said spiders adapted to deliver the cut stalks to a laterally movable conveyor and delivery belt, together with an automatically operated hopper for assembling and delivering quantities of the cut stalks at regular intervals from the said conveying belt, said hopper being positioned at the left hand side of the machine, and draft means for the machine also positioned on said left side, and chains, sprockets, and gear connections between the draft means and the erecting, gathering, cutting, assembling, and delivering means for operating all of the said last named means upon said movement of the machine.

In testimony whereof I affix my signature.

FIELDEN R. DEAN.